(12) United States Patent
Tseng et al.

(10) Patent No.: US 7,328,079 B2
(45) Date of Patent: Feb. 5, 2008

(54) PROCESS AND SYSTEM FOR CONVEYING SEMIFINISHED PRODUCTS DURING LCD MANUFACTURE

(75) Inventors: Wen Neng Tseng, Miao-Li (TW); Chien-Sung Deng, Miao-Li (TW); Hung Wen Yang, Miao-Li (TW)

(73) Assignee: Innolux Display Corp., Chu-Nan, Miao-Li County (TW)

( * ) Notice: Subject to any disclaimer, the term of this patent is extended or adjusted under 35 U.S.C. 154(b) by 304 days.

(21) Appl. No.: 11/141,943

(22) Filed: May 31, 2005

(65) Prior Publication Data
US 2005/0267619 A1    Dec. 1, 2005

(30) Foreign Application Priority Data
May 28, 2004    (TW) .............................. 93115285 A

(51) Int. Cl.
*G06F 19/00*    (2006.01)
(52) U.S. Cl. ................... 700/112; 700/115; 198/358
(58) Field of Classification Search ........ 700/112–116; 198/348, 358, 349
See application file for complete search history.

(56) References Cited

U.S. PATENT DOCUMENTS

| | | | |
|---|---|---|---|
| 6,554,106 B1* | 4/2003 | Tokimoto .................... | 186/49 |
| 6,931,303 B2* | 8/2005 | Chang et al. ................ | 700/228 |
| 7,035,714 B2* | 4/2006 | Anderson et al. ........... | 700/228 |
| 7,099,739 B2* | 8/2006 | Chen et al. .................. | 700/228 |
| 2003/0230468 A1* | 12/2003 | Uh et al. ..................... | 198/817 |

\* cited by examiner

Primary Examiner—Alexander Kosowski
(74) Attorney, Agent, or Firm—Wei Te Chung

(57) ABSTRACT

A system (20) for conveying semifinished products during the manufacturing of liquid crystal displays, includes a first processing station (21); a second processing station (22) proximate to the first processing station; a shortcut conveyor interconnecting the first processing station and the second processing station; a stocking conveyor interconnecting the first processing station and the second processing station, a conveyance route of the stocking conveyor being shortcut by the shortcut conveyor; a data reader (27) for judging if a to-be-processed semifinished product coming from the first processing station is instructed to be conveyed to the stocking conveyor; a sensor (29) for judging if the shortcut conveyor is fully loaded; and a controller for controlling the shortcut conveyor and the stocking conveyor to convey the semifinished product to the second processing station according to judging results of the date reader and the sensor. Because the half finished product can be directly conveyed to the next process station. The time for conveying the half finished product and the time for waiting to be produced of the half finished product are reduced. A controlling method of the system is also disclosed.

12 Claims, 3 Drawing Sheets

US 7,328,079 B2

PROCESS AND SYSTEM FOR CONVEYING SEMIFINISHED PRODUCTS DURING LCD MANUFACTURE

FIELD OF THE INVENTION

The present invention relates to a process for conveying semifinished products during the manufacturing of liquid crystal displays (LCDs), and a system for conveying semifinished products during the manufacturing of LCDs.

BACKGROUND

A color filter (CF) is a key component of an LCD. A process for manufacturing the CF generally includes a black matrix (BM) coating process, a CF coating process, and an indium tin oxide (ITO) film coating process. The CF coating process includes a red-color filter forming process, a green-color filter forming process, and a blue-color filter forming process.

Referring to FIG. 3, a typical conventional system 10 for conveying semifinished-products during the manufacturing of CFs includes a first station 11 for the BM coating process, a second station 12 for the red-color filter forming process, a third station 13 for the green-color filter forming process, a fourth station 14 for the blue-color filter forming process, a fifth station 15 for the ITO film coating process, and a stocking conveyor 18. The system 10 includes a plurality of conveyors for conveying the semifinished products of the CFs between the stocking conveyor 18 and the stations 11-15. the arrows shown in FIG. 3 cooperatively represent a conveyance route for conveying the semifinished products. In operation, the semifinished products are first conveyed to the first station 11, for coating BMs thereon. The semifinished products are then conveyed to the stocking conveyor 18. To form a red-color filter on the semifinished products, the semifinished products are conveyed from the stocking conveyor 18 to the second station 12. Likewise, once the red-color filter forming process is completed, the semifinished products are then conveyed to the stocking conveyor 18. Subsequent conveyance of the semifinished products between the stations 13, 14, or 15 and the stocking conveyor 18 is similar.

Under the above-mentioned working mode of the system 10, the semifinished products have to be conveyed to the stocking conveyor 18, and wait for a period of time to be conveyed to the subsequent station. However, the time spent conveying the semifinished products and the waiting time for onward conveyance to the subsequent station may be unduly long. As a result, the costs of mass production are increased.

What are needed, therefore, are a process for conveying semifinished products and a system for conveying semifinished products during the manufacturing of LCDs, which process and system are capable of reducing the manufacturing time of the LCDs and improving productivity.

SUMMARY

In a preferred embodiment, a process for conveying a semifinished product during the manufacturing of a liquid crystal display, includes:
 (a) judging if a to-be-processed semifinished product coming from a prior processing station is instructed to be conveyed to a stocking conveyor; if yes, conveying the semifinished product to the stocking conveyor; if no, going to step (b);
 (b) judging if a shortcut conveyor that interconnects a current processing station and a subsequent processing station is fully loaded; if yes, conveying the semifinished product to the stocking conveyor and holding the semifinished product at the stocking conveyor pending further instruction; if no, going to step (c);
 (c) conveying the semifinished product to the shortcut conveyor, and then conveying the semifinished product to the subsequent processing station.

In another preferred embodiment, system for conveying semifinished products during the manufacturing of liquid crystal displays, includes a first processing station; a second processing station proximate to the first processing station; a shortcut conveyor interconnecting the first processing station and the second processing station; a stocking conveyor interconnecting the first processing station and the second processing station, a conveyance route of the stocking conveyor being shortcut by the shortcut conveyor; a data reader for judging if a to-be-processed semifinished product coming from the first processing station is instructed to be conveyed to the stocking conveyor; a sensor for judging if the shortcut conveyor is fully loaded; and a controller for controlling the shortcut conveyor and the stocking conveyor to convey the semifinished product to the second processing station according to judging results of the date reader and the sensor. Because the system has short cut, the half finished product can be directly conveyed to the next process station. The time for conveying the half finished product and the time for waiting to be produced of the half finished product are reduced.

Other advantages and novel features will become more apparent from the following detailed description when taken in conjunction with the accompanying drawings, in which:

DETAILED DESCRIPTION OF PREFERRED EMBODIMENTS

Reference will now be made to the drawings to describe preferred embodiments of the present invention in detail.

Figure 1:
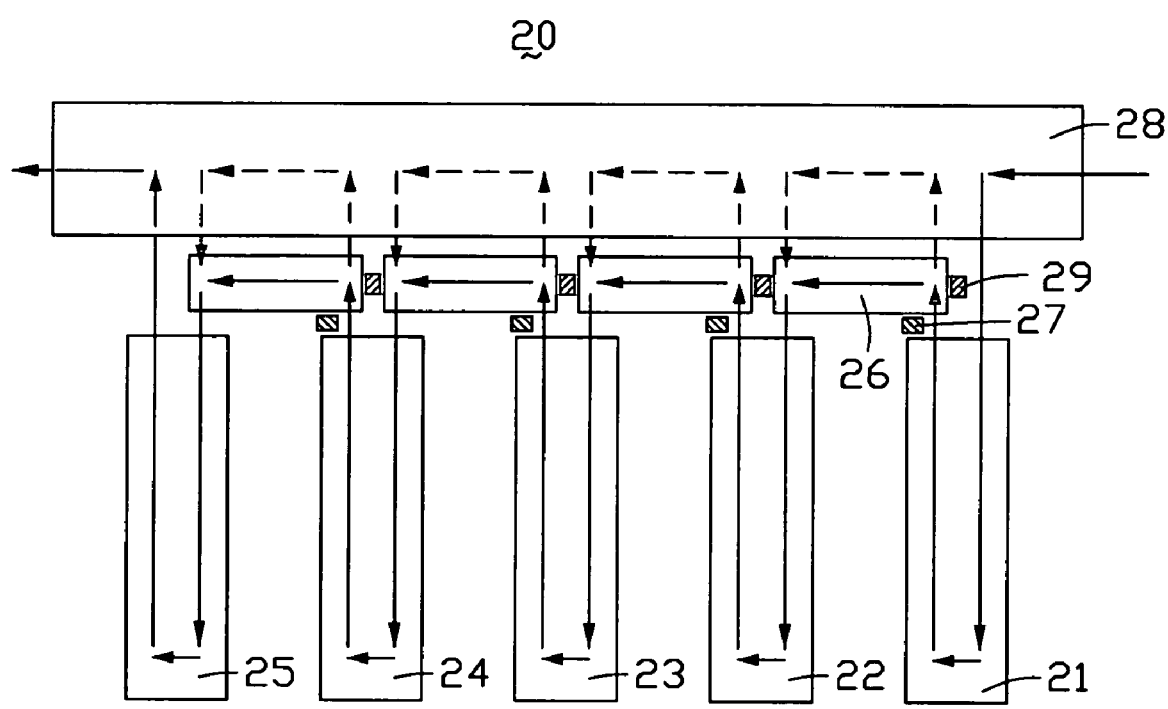
FIG. 1 is a schematic, plan view of a system for conveying semifinished products during the manufacturing of LCDs, according to a preferred embodiment of the present invention.

Referring to FIG. 1, the following description is of a system 20 for conveying semifinished products during the manufacturing of CFs, for the purposes of exemplary illustration of an embodiment of the present invention. However, embodiments of the present invention are not intended to be limited to the system 20 and a process for operating the system 20. The inventive system 20 and related process can be utilized to convey semifinished products during the manufacturing of any of various components of LCDs. In the illustrated embodiment, the system 20 includes a first station 21 for a BM coating process, a second station 22 for a red-color filter forming process, a third station 23 for a green-color filter forming process, a fourth station 24 for a blue-color filter forming process, a fifth station 25 for an ITO film coating process, a stocking conveyor 28, four shortcut conveyors 26, four data readers 27, and four sensors 29. The system 20 also includes a plurality of conveyors (not labeled) for conveying the semifinished products of the CFs between the stations 21-25 and the shortcut conveyors 26 or the stocking conveyor 28.

The stations 21-25 are arranged in a line in accordance with the processing sequence of the semifinished products of the CFs. The stocking conveyor 28 is arranged opposite corresponding same sides of the stations 21-25. Each shortcut conveyor 26 interconnects two adjacent stations. Each shortcut conveyor 26 includes one data reader 27 and one sensor 29 disposed around an entrance of the shortcut conveyor 26. Unbroken arrows shown in FIG. 1 cooperatively represent a primary conveyance route of the semifinished products of the CFs. Broken arrows cooperatively represent a secondary conveyance route of the semifinished products of the CFs.

Figure 2:
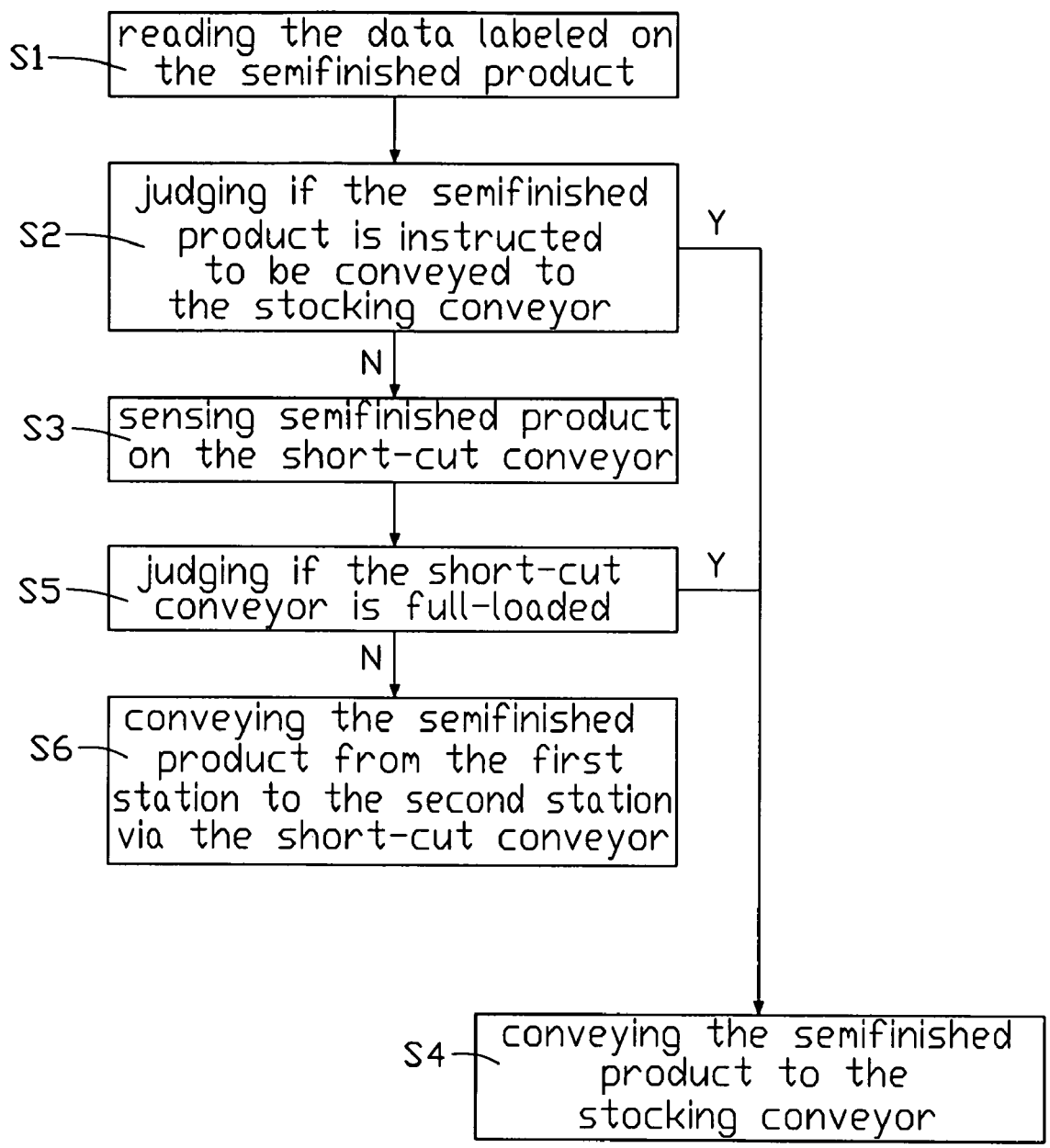
FIG. 2 is a flow chart of a process for operating the system of FIG. 1.
Figure 3:
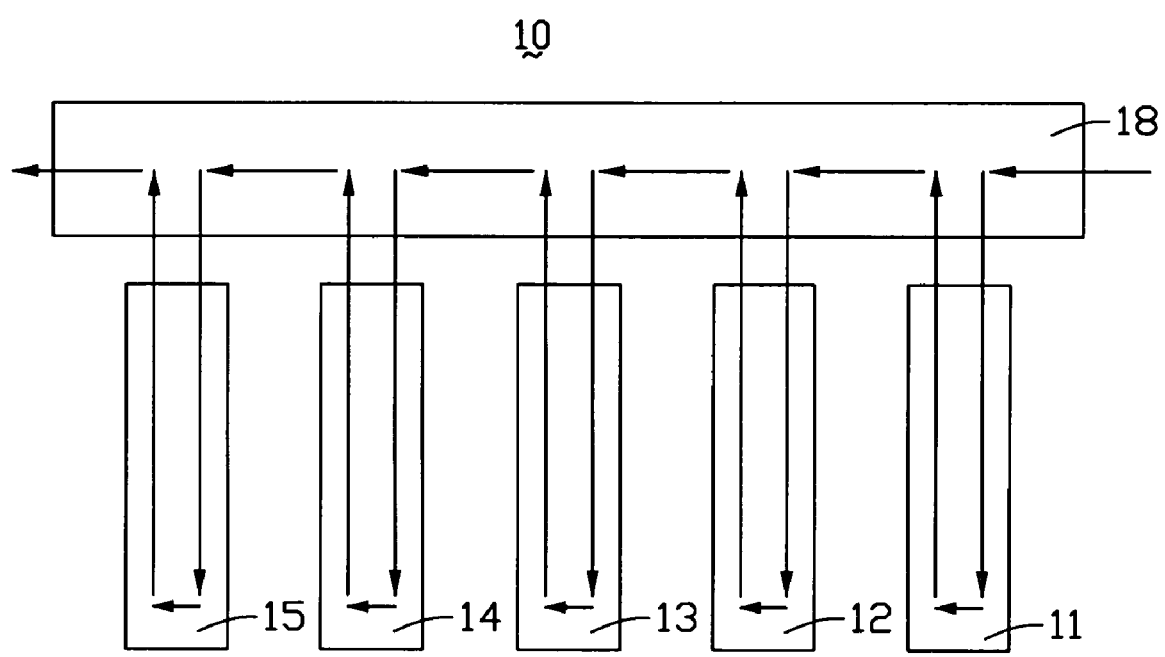
FIG. 3 is schematic, plan view of a conventional system for conveying semifinished products during the manufacturing of CFs.

Referring also to FIG. 2, this is a flow chart of a process for operating the system 20. The flow chart represents a controlling process for conveying the half finished products from a current station to the subsequent station. The following description is of conveyance of the semifinished products from the first station 21 to the second station 22, for the purposes of exemplary illustration of an embodiment of the present invention. Conveyance of the semifinished products between the stations 22-25 is similar to that between the first station 21 and the second station 22, which will be further explained below. The flow chart illustrates the following steps:

In step S1: data labeled on the semifinished product is read by the data reader 27 after the semifinished product has been coated with a BM.

In step S2: The reader 27 analyzes the data and judges if the to-be-processed semifinished product coming from the first station 21 is instructed to be conveyed to the stocking conveyor 28; if yes, the semifinished product is conveyed to the stocking conveyor 28. If the result is "yes," go to step S4; and if the result is "no," go to step S3.

In step S3: The sensor 29 senses the semifinished products on the shortcut conveyor 26.

In step S4: The semifinished products are conveyed to the stocking conveyor 28, and are held at the stocking conveyor 28 pending further instruction.

In step S5: The sensor 29 judges if the shortcut conveyor 26 is fully loaded. If the result is "yes," go to step S4; and if the result is "no," go to step S6.

In step S6: The semifinished products are conveyed to the shortcut conveyor 26, and are then conveyed on to the second station 22.

In addition, if there is no semifinished product coming from the prior processing station to be conveyed to the shortcut conveyor 26, the semifinished products held at the stocking conveyor 28 can be supplied to the subsequent processing station via the stocking conveyor 28. When supplying semifinished products held at the stocking conveyor 28 to the subsequent processing station, a first in of the semifinished products is preferably first conveyed to the subsequent processing station (i.e., first in, first out). In addition, the semifinished products held at the stocking conveyor 28 are preferably first supplied to the subsequent processing station via the stocking conveyor 28 after each of a series of predetermined periods of time elapses. Furthermore, the semifinished products held at the stocking conveyor 28 are preferably first supplied to the subsequent processing station via the stocking conveyor 28 when the number of semifinished products held at the stocking conveyor 28 has accumulated up to a predetermined threshold quantity.

By way of the shortcut conveyors 26, the semifinished products can be directly conveyed to the subsequent station. The time spent conveying the semifinished products and the waiting time for conveying the semifinished products to the subsequent station can both be reduced.

It is to be understood, however, that even though numerous characteristics and advantages of the preferred embodiments have been set forth in the foregoing description, together with details of the structure and functions of the preferred embodiments, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A process for conveying a semifinished product during the manufacturing of a liquid crystal display, comprising:
   (a) judging if a to-be-processed semifinished product coming from a prior processing station is instructed to be conveyed to a stocking conveyor; if yes, conveying the semifinished product to the stocking conveyor; if no, going to step (b);
   (b) judging if a shortcut conveyor that interconnects a current processing station and a subsequent processing station is fully loaded; if yes, conveying the semifinished product to the stocking conveyor and holding the semifinished product at the stocking conveyor pending further instruction; if no, going to step (c);
   (c) conveying the semifinished product to the shortcut conveyor, and then conveying the semifinished product to the subsequent processing station.

2. The process as claimed in claim 1, wherein step (a) further comprises the step of: judging if there is no semifinished product coming from the prior processing station and being conveyed to the shortcut conveyor; if yes, supplying a semifinished product held at the stocking conveyor to the subsequent processing station.

3. The process as claimed in claim 2, wherein when a semifinished product held at the stocking conveyor is supplied to the subsequent processing station, a first in of the semifinished products is preferably first conveyed to the subsequent processing station.

4. The process as claimed in claim 1, wherein a semifinished product held at the stacking conveyor is first supplied to the subsequent processing station after a predetermined period of time has elapsed.

5. The process as claimed in claim 1, wherein the semifinished product held at the stocking conveyor is first supplied to the subsequent processing station when a number of semifinished products held at the stocking conveyor has accumulated up to a predetermined threshold quantity.

6. The process as claimed in claim 1, wherein the step of judging if a to-be-processed semifinished product coining from a prior processing station is instructed to be conveyed to a stocking conveyor, is performed by means of a data reader.

7. The process as claimed in claim 1, wherein the step of judging if a shortcut conveyor that interconnects a current processing station and a subsequent processing station is fully loaded, is performed by means of a sensor.

8. A system for conveying semifinished products during the manufacturing of liquid crystal displays, comprising:
   a first processing station;
   a second processing station proximate to the first processing station;

a shortcut conveyor interconnecting the first processing station and the second processing station;

a stocking conveyor interconnecting the first processing station and the second processing station, a conveyance route of the stocking conveyor being shortcut by the shortcut conveyor;

a data reader for judging if a to-be-processed semifinished product coming from the first processing station is instructed to be conveyed to the stocking conveyor;

a sensor for judging if the shortcut conveyor is fully loaded; and a controller for controlling the shortcut conveyor and the stocking conveyor to convey the semifinished product to the second processing station according to judging results of the data reader and the sensor.

9. The system as claimed in claim 8, wherein the first processing station is for forming a black matrix, and the second processing station is for forming a red-color filter.

10. The system as claimed in claim 8, wherein the first processing station is for forming a red-color filter, and the second processing station is for forming a green-color filter.

11. The system as claimed in claim 8, wherein the first processing station is for forming a green-colored filter, and the second processing station is for forming a blue-color filter.

12. The system as claimed in claim 8, wherein the first processing station is for forming a blue-color filter, and the second processing station is for forming an indium tin oxide film.

* * * * *